United States Patent
Yoshizawa et al.

(10) Patent No.: US 6,777,915 B2
(45) Date of Patent: Aug. 17, 2004

(54) CHARGER, BATTERY PACK, AND CHARGING SYSTEM USING THE CHARGER AND BATTERY PACK

(75) Inventors: Hiroshi Yoshizawa, Hirakata (JP); Junichi Shinbara, Neyagawa (JP); Masakage Komori, Utsunomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/312,607

(22) PCT Filed: Jun. 26, 2001

(86) PCT No.: PCT/JP01/05474

§ 371 (c)(1),
(2), (4) Date: Dec. 27, 2002

(87) PCT Pub. No.: WO02/03525

PCT Pub. Date: Jan. 10, 2002

(65) Prior Publication Data

US 2003/0107347 A1 Jun. 12, 2003

(30) Foreign Application Priority Data

Jun. 30, 2000 (JP) .................................. 2000-198300

(51) Int. Cl.[7] .............................. H02J 7/00; H02J 7/16
(52) U.S. Cl. ...................................... 320/137; 320/150
(58) Field of Search .......................... 320/137, 133, 320/139, 150, 157, 158, 163

(56) References Cited

U.S. PATENT DOCUMENTS

| | | | | |
|---|---|---|---|---|
| 5,739,673 A | * | 4/1998 | Le Van Suu | 320/150 |
| 5,949,213 A | * | 9/1999 | Lanni | 320/106 |
| 6,074,777 A | | 6/2000 | Reimers et al. | 429/61 |

FOREIGN PATENT DOCUMENTS

| | | | |
|---|---|---|---|
| DE | 621990 | * | 1/1992 |
| EP | 0 939 474 | | 9/1999 |
| JP | 08-019192 | | 1/1996 |
| JP | 08-116627 | | 5/1996 |
| JP | 11-065717 | | 3/1999 |
| JP | 11-150874 | | 6/1999 |
| JP | 2000-058115 | | 2/2000 |
| JP | 2000-134820 | | 5/2000 |

* cited by examiner

*Primary Examiner*—Pia Tibbits
(74) *Attorney, Agent, or Firm*—Jordan and Hamburg LLP

(57) ABSTRACT

A charge control means (10) provided for a battery charging apparatus (1) conducts protection control for a battery pack (2) by transmitting a signal to an output control switch (14) for turning off an output when a rise rate of the temperature of the battery pack (2) detected based on information from a temperature detection terminal (8) is equal to or more than a predetermined value, or a rise rate of the voltage of the battery pack (2) detected based on information from a voltage detection terminal (9) is equal to or less than a predetermined value.

24 Claims, 2 Drawing Sheets

CHARGER, BATTERY PACK, AND CHARGING SYSTEM USING THE CHARGER AND BATTERY PACK

TECHNICAL FIELD

The present invention relates to a battery pack, and a battery charging system using the battery pack, and particularly relates to a protection apparatus for a rechargeable battery effective for a lithium ion rechargeable battery.

BACKGROUND ART

The following section describes, with reference to FIG. 4, conventional protection control for a battery pack including a lithium ion rechargeable battery as a power supply for portable electronic equipment. A lithium ion rechargeable battery 111 is serially connected between a positive terminal 116 and a negative terminal 117 through a reverse-current-preventing diode 115. Simultaneously, a FET switch 114 including a MOS FET with a parasitic diode for protecting against overcharge (referred to as a charge FET hereafter), and a MOS FET with a parasitic diode for protecting against overdischarge (referred to as a discharge FET hereafter), is serially connected with the rechargeable battery 111. A control circuit 112 for controlling the turning on and off of the charge FET, and the discharge FET, of the FET switch 114 is provided. A discharge current represented as a voltage on both sides of the lithium ion rechargeable battery 111, and a voltage on both sides of the FET switch 114, is supplied for the control circuit 112. This control circuit 112 uses the FET switch 114 to conduct four-value control including turning on both charge and discharge, turning on only charge, turning on only discharge, and turning off both charge and discharge through a flip-flop 113 based on the entered information. A protection circuit including the control circuit 112, the flip-flop 113, the FET switch 114, is generally referred to as an SU (Safety Unit).

Thus, when the portable electronic equipment is charged, two types of control including: the charge control by the main unit of the electronic equipment or a battery charger; and the control by the aforementioned SU in the battery pack which is activated if the charge control fails, exist independently for controlling the charge. The following section describes how these two types of control operate generally.

The charge control by the portable electronic equipment or the battery charger in a normal state can be any one of: (1) constant voltage charge at 4.2 V, (2) maximum current control at 0.7 C, and (3) charge completion control (based on the current, the charge period, or combination thereof), and the SU in the battery pack does not operate. When these types of charge control are not operable, such as due to a failure or a malfunction, the SU in the battery pack controls to (1) disconnect a charge circuit (the disconnection may be recoverable or non-recoverable) when a voltage of 4.35 V±0.05 V is detected, which is a range set so as not to overlap the normal fluctuation range of the charge voltage in consideration of temperature variation and tolerance from the control of the charge voltage; and to (2) disconnect the charge circuit when the maximum current of 2.0 C to 4.0 C is detected. Further, in the case that the SU does not operate, the portable electronic equipment or the battery charger provide such protection functions as: (1) disconnecting the charge circuit when the voltage of 4.55 V±0.05 V is detected, (2) disconnecting the charge circuit when a current of 1.3 times of the maximum charge current is detected, (3) not charging when the surface temperature of the lithium ion rechargeable battery 111, which is detected by a thermistor 119 and is transmitted through a battery-pack-side temperature detection terminal 118, is out of the range of 0° C. to 40° C., and (4) stopping the charge after a timer count up two to three hours.

In this manner, the reliability (safety) of the product is secured while there are provided multiple methods of protection for charging the lithium ion rechargeable battery in case of a failure as a basic policy.

However, since the multiple methods of protection are provided for the above-mentioned conventional battery pack with an integrated SU and the conventional battery charging system using this type of the battery pack while it is assumed that the SU exists in the battery pack, it is apparently impossible to eliminate the SU. For the battery pack, the major parts of the SU alone, such as the control circuit 112, the flip-flop 113, and the FET switch 114, account for about 30% of the total cost. This partially causes an increase in the cost of any such battery pack which includes the lithium ion rechargeable battery. Although all types of ideas such as one disclosed in Japanese Patent Laid-Open Publication No. Hei. 8-116627 are embodied for improving the protection features for an independent battery pack, applying all of them also cause a serious problem in terms of the cost.

An object of the present invention is to solve these conventional problems by improving an independent battery pack which includes a lithium rechargeable battery as a unit cell, especially a lithium ion rechargeable battery, as well as redesigning the entire battery charging system, thereby eliminating the principal parts of the SU while maintaining the multiple protection, with a resultant decrease in the cost largely, and while also reducing the development period and the size of the battery pack.

DISCLOSURE OF THE INVENTION

To achieve the object above, the battery charging system of the present invention includes a battery charging apparatus and a battery pack. The battery charging apparatus includes an AC/DC converter for converting commercial power supply to DC, a charge output terminal for supplying the battery pack with an output from the AC/DC converter, a GND terminal corresponding to the charge output terminal, voltage/current detection means provided on a charge path, over voltage protection means provided on the charge path, a voltage detection terminal for detecting a voltage of the battery pack, a temperature detection terminal for detecting a temperature of the battery pack, charge control means for conducting different types of charge control based on signals received from the voltage/current detection means, the voltage detection terminal, and the temperature detection terminal, and an output control switch which is provided on the charge path and conducts output control based on a signal received from the charge control means. The battery pack includes a lithium ion rechargeable battery to be charged, a positive terminal and a negative terminal for electrically connecting the lithium ion rechargeable battery with the battery charging apparatus, a thermistor for detecting a surface temperature of the rechargeable battery, and a battery-pack-side temperature detection terminal for providing the battery charging apparatus with temperature information detected by the thermistor. The battery charging system of the present invention conducts protection control for the battery pack such that the charge control means transmits a signal to the output control switch for turning off an output when a rise rate of the battery pack temperature received by the charge control means through the battery-pack-side temperature detection terminal and the temperature detection terminal is equal to or more than a predetermined value.

With this constitution, it is preferable that the lithium ion rechargeable battery used as a unit cell includes an overcharge-inhibition additive. With this additive, since the battery surface temperature rises early or rapidly when overcharge occurs, the protection control activated by the rise in the temperature is executed earlier or more easily.

In addition to the battery charging apparatus, the battery charging system of the present invention includes a battery pack including a lithium ion rechargeable battery to be charged, a positive terminal and a negative terminal for electrically connecting the lithium ion rechargeable battery with the battery charging apparatus, battery voltage detection means for detecting the battery voltage of the lithium ion rechargeable battery, and a battery-pack-side voltage detection terminal for providing the battery charging apparatus with voltage information detected by the battery voltage detection means. When a rise rate of the battery pack voltage received by the charge control means through the battery-pack-side voltage detection terminal and the voltage detection terminal is equal to or less than a predetermined value, the battery charging system conducts protection control for the battery pack such that the charge control means transmits a signal for turning off the output to the output control switch.

With this constitution, it is preferable that the lithium ion rechargeable battery used as a unit cell includes an overcharge-inhibition additive. With this additive, since a change of the rise rate of the battery voltage occurs early when overcharge occurs, the protection control activated by the change of the rise in the voltage is executed earlier or more easily.

Consequently, it is possible to largely decrease the cost, and to reduce the size and the development period of the battery pack by eliminating the principal parts of the SU from the battery pack without adding specific constitution elements while the battery charging system as a whole is providing the multiple protection.

BEST MODE FOR CARRYING OUT THE INVENTION

The following section details preferred embodiments of the present invention with reference to the drawings. The following embodiment is an example embodying the invention, and does not limit the technical scope of the present invention.

Figure 1:
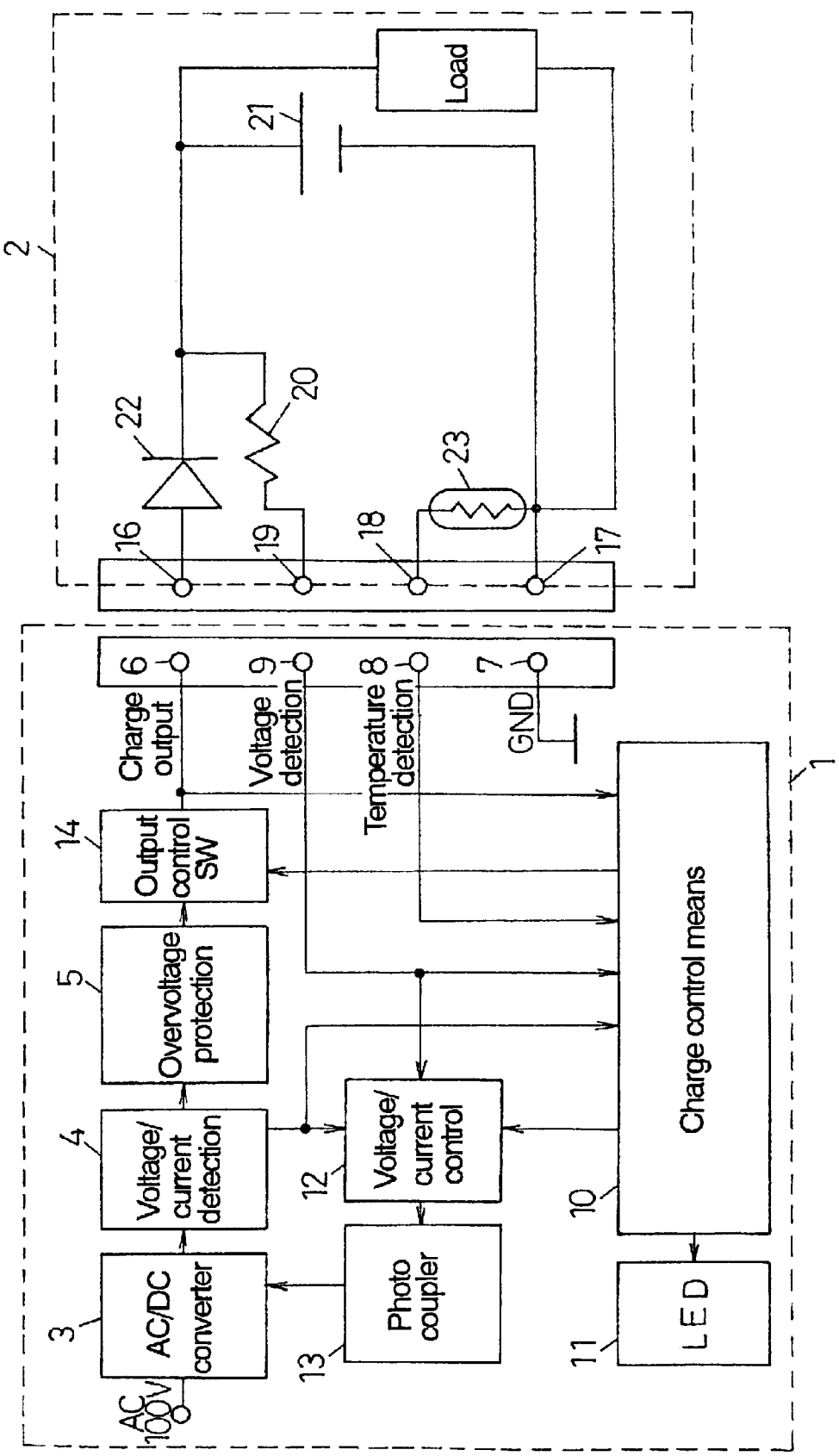
FIG. 1 is a block diagram of a battery charging system of the present invention.

FIG. 1 is a block diagram showing a battery charging system of the present invention, In this drawing, reference numeral 1 denotes a battery charging apparatus such as an independent battery charger, or a combination of an apparatus such as a notebook PC and a cellular phone, and a battery charger or an AC adapter. Reference numeral 2 denotes a battery pack including a lithium ion rechargeable battery as a unit cell.

The battery charging apparatus 1 includes an AC/DC converter 3 for converting commercial power supply to DC, voltage/current detection means 4, which is provided on a charge path, for measuring a voltage and a current supplied for the battery pack 2, over voltage protection means 5, which is also provided on the charge path, for preventing an excessive voltage from flowing to the battery pack 2, a charge output terminal 6 and a GND terminal 7 for supplying the battery pack 2 with a voltage output, a temperature detection terminal 8 for detecting a temperature of the battery pack, a voltage detection terminal 9 for detecting a voltage of the battery pack, and charge control means 10 for conducting different types of charge control based on signals received from the voltage/current detection means 4, the temperature detection terminal 8, and the voltage detection terminal 9. The charge control means 10 conducts control such as turning on a LED 11 in a predetermined color, blinking the LED 11 in a predetermined color, and starting/stopping the charge through voltage/current control means 12, a photo coupler 13, and an output control switch 14 according to a charge state.

The battery pack 2 includes a positive terminal 16, a negative terminal 17, a lithium ion rechargeable battery 21 including a single cell or a plurality of cells, a reverse-current-preventing diode 22, a resistor 20 serving as battery voltage detection means for measuring the battery voltage, a battery-pack-side voltage detection terminal 19 for supplying the battery charging apparatus 1 with battery voltage information, a thermistor 23 for detecting a surface temperature of the lithium ion rechargeable battery 21, and a battery-pack-side temperature detection terminal 18 for supplying the battery charging apparatus 1 with temperature information.

In the present invention, the individual terminals such as the charge terminal, the temperature detection terminal, and the voltage detection terminal can conduct similar control whether they are contact type or non-contact type.

Figure 4:
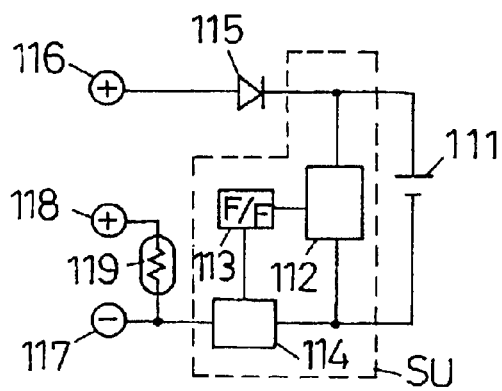
FIG. 4 is a block diagram of a conventional battery pack.

As seen in FIG. 1, in the battery charging system of the present invention, an SU is removed, which serves as a protection circuit, and is enclosed by a broken line out of constitution members in a conventional battery pack shown in FIG. 4. This part includes an IC substrate and a semiconductor switch for measuring and controlling the voltage, and accounts for the most of the cost of the protection circuit. On the other hand, since a PTC/thermal fuse, the thermistor 23, and the reverse-current-preventing diode 22 are low cost, they remain.

The present invention proposes a new battery, charge control, thereby realizing multiple protection without SU. Further, adding an overcharge-inhibition additive and the like to the unit cell changes behaviors of the voltage and the battery temperature when the unit cell is overcharged, and the battery charging apparatus 1 detects the behaviors for controlling the charge so as to remarkably increase the reliability of protection against the overcharge.

The following section describes specific changes in the control.

First, a permissible voltage which is a reference for disconnecting a circuit as a protection feature in the battery charging apparatus 1 is changed from a conventional 4.55 V to 4.35 V. Namely, the battery charging apparatus 1 includes the permissible voltage which used to be the reference for disconnecting the circuit as the protection feature of the conventional SU.

Figure 2:
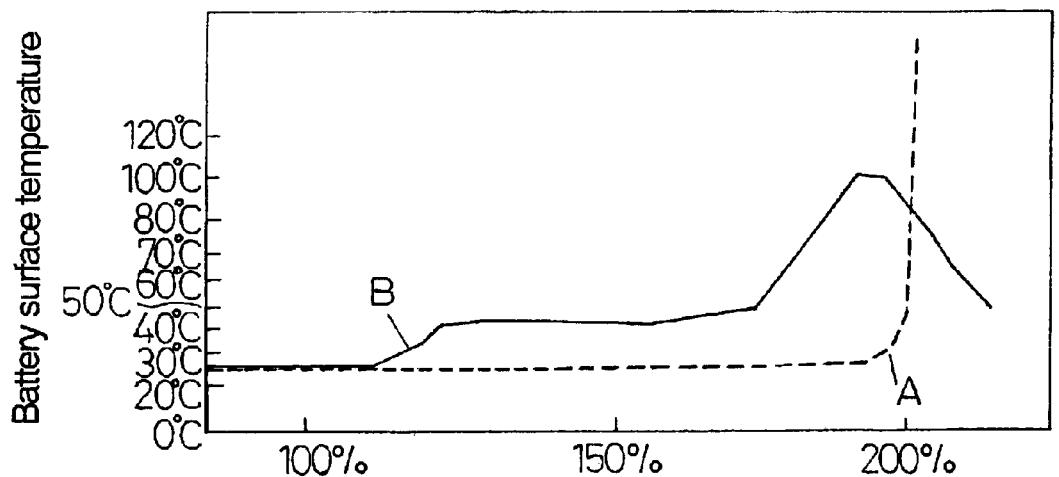
FIG. 2 is a temperature characteristic chart in an overcharge state of lithium ion rechargeable batteries.

Secondly, the charge control means 10 transmits a signal to the output control switch 14 for turning off an output so as to conduct ΔT/dt protection control when a rise rate of the battery pack temperature received by the charge control means 10 through the temperature detection terminal 8 is equal to or more than a predetermined value. As shown in FIG. 2, since the surface temperature of the battery changes rapidly in the overcharge state, this change is detected to terminate the charge. Specifically, the charge control means 10 in the battery charging apparatus 1 receives the temperature information detected by the thermistor 23, mathematically processes the information, and then turns off the output control switch 14 so as to terminate the charge when the rise rate of the temperature is equal to or more than the predetermined value. As the specific predetermined value, though the value depends on the characteristics of the unit cell, ΔT/dt should be 0.5° C./minute or more, preferably 1° C./minute or more which includes some margin for preventing a detection error.

Figure 3:
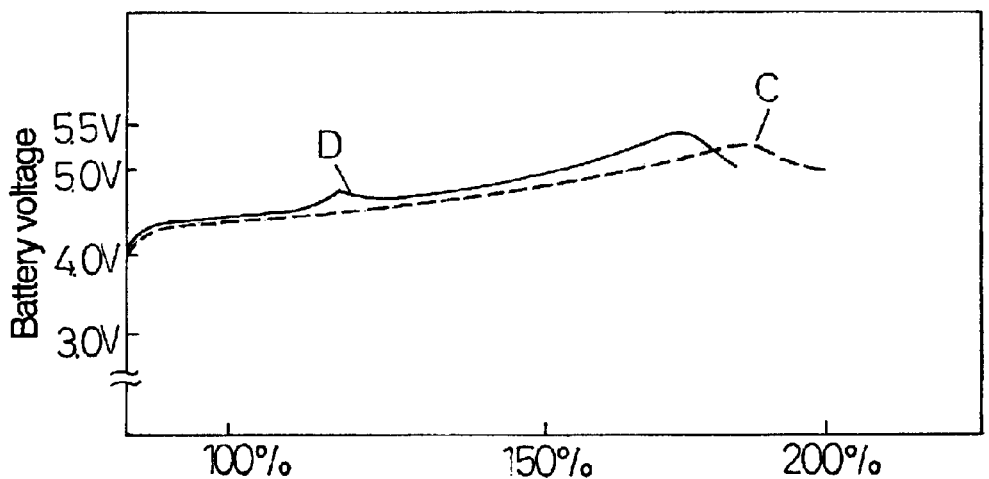
FIG. 3 is a voltage characteristic chart in the overcharge state of lithium ion rechargeable batteries.

Thirdly, the charge control means 10 transmits a signal to the output control switch 14 for turning off the output so as to conduct ΔV/dt protection control when the rise rate of the battery pack voltage received by the charge control means 10 through the voltage detection terminal 9 is equal to or less than a predetermined value. As shown in FIG. 3, though the battery voltage rises in the overcharge state, since the voltage falls once after a peak of 5.5 V, this behavior is detected to terminate the charge. Specifically, the charge control means 10 in the battery charging apparatus 1 receives the voltage information detected by the resistor 20 serving as the battery voltage detection means, mathematically processes the information, and turns off the output control switch 14 so as to terminate the charge when the rise rate of the voltage is equal to or less than the predetermined value. As a specific predetermined value, the value ΔV/dt should be less than zero which includes some margin for preventing a detection error.

With these three types of the charge control along with conventional temperature range control, timer control, and control by a thermal fuse or a current cutoff mechanism of the unit cell itself, the multiple protection is realized without SU. The charge control is conducted such that either one of the charge control based on the temperature detection and the charge control based on the voltage detection is essentially conducted, preferably the charge control by changing the permissible voltage of the battery charging apparatus is added further, and more preferably all of the three types of the charge control are conducted.

The following section describes cases of two major failures when the charge control described above is used.

First, when the charge control of the battery charging apparatus 1 entirely fails (the voltage detection feature of the battery charging apparatus fails), the charge is conducted at the maximum withstand voltage and current which the battery charging apparatus 1 can supply. Generally, continuous charge is conducted at the withstand voltage of 10 to 12 V, and at the current of 3C. In this case, though a battery pack without an SU should ensure perfect protection control, research and development in protection control in the independent unit cell has been actively conducted, and thus reliable multiple protection realized by increasing the precision of the current cut-off mechanism, adding an overcharge-inhibition additive, and adopting a high precision thermal fuse using PTC and shape memory alloy is available.

Secondly, if the 4.2 V control is not executable due to a malfunction, the SU is activated to disconnect the charge circuit when the battery voltage reaches 4.35 V in the conventional charge control. Since the present invention does not include the SU, the three types of the features described above terminate the charge.

When the charge control by changing the permissible voltage of the battery charging apparatus is used, the charge is terminated when the battery voltage reaches 4.35 V as is done by the conventional SU. As an additional protection feature, charge control means based on temperature/voltage detection is provided.

When the charge control based on the temperature detection is used, the charge is terminated when the change in the surface temperature of the battery exceeds a set value (for example 0.5° C./minute). As additional protection features, other means described above can be added. In this case, adding the overcharge-inhibition additive described above to the unit cell changes behavior of the battery temperature in the overcharge state, and thus the protection control is conducted earlier and more properly.

When the charge control is conducted based on the voltage detection, since the rising voltage during the charge falls once after a peak of about 5 V in the overcharge region, the charge is terminated if ΔV/dt<0. As additional protection features, other means described above can be added. In this case, adding the overcharge-inhibition additive described above to the unit cell changes behavior of the battery voltage in the overcharge state, and thus the protection control is conducted earlier and more properly.

The following section briefly describes a basic idea on selecting the overcharge-inhibition additive and effects of adding the overcharge-inhibition additive. Though the overcharge-inhibition additive does not act in the normal charge and discharge state, it acts when the voltage exceeds a specified charge voltage (currently 4.2 V). As a result, it causes such phenomena that the surface temperature of the battery increases rapidly, and the charge voltage changes as ΔV/dt<0. Specifically, the additive is quickly decomposed, and gas is generated consequently when the voltage exceeds the specified charge voltage (in the overcharge region). Then, the gas filled between the electrodes increase the internal resistance of the battery, and thus the battery surface temperature increases rapidly due to generated Joule's heat and reaction heat. If the overcharge-inhibition additive does not exist, since these phenomena do not occur until electrolyte start decomposing, and thus the overcharge progresses, the overcharge causes a problem in terms of safety. However, if the overcharge-inhibition additive exists, the phenomenon of temperature rise occurs earlier, and thus the charge is terminated on an early stage of the overcharge. As specific types of the additive, there exist ortho-terphenyl, biphenyl, diphenyl ether, and the like, and these additives cause oxidative polymerization reaction at about 4.5 V. Consequently a film is formed between the electrodes, and thus, acts as a resistance, thereby generating Joule's heat.

FIG. 2 shows respective changes in the battery surface temperature of a lithium ion rechargeable battery including the overcharge-inhibition additive which changes the surface temperature of the battery, and a lithium ion rechargeable battery not including the overcharge-inhibition additive. As a broken line in the drawing shows, when the overcharge-inhibition additive is not included, since the surface temperature of the battery increases rapidly at a point A which is close to 200% of the full charge capacity, the detection is possible. However, the overcharge has already progressed considerably at this point. Thus, the detecting temperature at the point A causes a problem in terms of safety. On the other hand, when the overcharge-inhibition additive is added to solve this problem, the increase in the surface temperature starts earlier as a solid line in the drawing shows, and it is possible to increase the temperature once by a certain amount at a point B which is close to 120% of the full charge capacity, for example, and then to restrain the following temperature increase to relatively low. As a result, it is possible to simultaneously achieve the increase of safety and the early and easy detection.

Similarly FIG. 3 shows respective changes in the battery voltage of a lithium ion rechargeable battery including the overcharge-inhibition additive which changes the battery voltage, and a lithium ion rechargeable battery not including the overcharge-inhibition additive. As a broken line in the drawing shows, when the overcharge-inhibition additive is not included, since the voltage drops at a point C after the battery voltage increases to 5.5 V, observing this phenomenon detects the overcharge. However, since the overcharge has already progressed considerably at this point, a problem exists in terms of safety. On the other hand, when the overcharge-inhibition additive is added to solve this problem, as a solid line in the drawing shows, it is possible to drop the battery voltage at a point D close to 120% of the full charge capacity, for example, and thus to observe this phenomenon. Consequently, it is possible to simultaneously achieve the increase of safety and the early and easy detection.

In this way, since the battery charging apparatus 1 conducts the protection control in consideration of the change in the temperature or the voltage of the lithium ion rechargeable battery 21 in the overcharged state, the cost of the battery pack 2 is largely decreased, and simultaneously the development period and the size of the battery pack 2 are reduced by eliminating the major parts of the SU from the battery pack 2 without adding specific constitution elements while the battery charging system as a whole is providing the multiple protection.

Though the present embodiment is described while the values such as the battery voltage of the single cell are used, it is obvious that only these values change for multiple cells, and the similar control is possible.

Also, in preparation for a case that the protection control of the present invention does not operate for some reason, it is preferable that the battery charging apparatus 1 include such additional conventional features as disconnecting the charge circuit by detecting a current of 1.3 times of the maximum charge current, suspending the charge when the battery temperature is out of a range of 0° C. to 40° C., and stopping the charge after two to three hours based on a timer.

Further, in the present embodiment, since reducing the cost as the entire battery charging system is intended, the control means required for the protection control feature based on detecting the rise rate of the temperature and the rise rate of the voltage, and the switch including FETs are realized by using the conventional charge control means 10 and the output control switch 14, and simultaneously by changing software. However, when a failure of the charge control means 10 and the output control switch 14 is also considered, it is obviously possible to provide only the switch independently on the charge path, or to provide both the control means and the switch independently, for example. In these cases, though it is difficult to reduce the cost in total, it is possible to largely decrease the cost of the battery pack 2, and to reduce the development period and the size.

While the present embodiment describes a case where the lithium ion rechargeable battery is used, the present invention also provides an effect for a lithium rechargeable battery (such as a battery using lithium metal as a negative electrode) other than lithium ion rechargeable batteries.

As conventional charge control for an alkaline rechargeable battery, there is so called $-\Delta V$ detection which detects full charge by detecting a voltage drop, and then stops the charge. Since a voltage drop phenomenon does not exist before the full charge in the case of lithium ion rechargeable batteries, and simultaneously the battery system is different, it is not simply conceivable to use similar charge control for lithium ion rechargeable batteries, and it is even less conceivable to apply it to protection control for the lithium ion rechargeable batteries.

Industrial Applicability

As the embodiment described above clearly shows, the present invention considers the entire battery charging system for providing the multiple protection control based on the recent increase of the safety of the unit cell, and the progress in analysis of the battery voltage and temperature behaviors of the unit cell. Thus, with the added protection control feature by the battery charging apparatus of the present invention along with the conventional control such as the temperature range control, the timer control, and the control by a thermal fuse or a current cut-off mechanism of the independent unit cell, the multiple protection is realized without the major parts of the SU, and consequently sufficient safety is provided. Thus the invention is effective for largely decreasing the cost of the battery pack, and reducing the size, and the development period of the battery pack.

What is claimed is:

1. A battery pack to be charged by a battery charging apparatus including:

an AC/DC converter for converting commercial rower supply to DC;

a charge output terminal for Supplying the battery pack with an output from the AC/DC converter;

a GND terminal corresponding to the charge output terminal;

voltage/current detection means provided on a charge path;

over voltage protection means provided on the charge path;

a voltage detection terminal for detecting a voltage of the battery pack;

a temperature detection terminal for detecting a temperature of the battery pack;

charge control means conducting different types of charge control based on signals received from the voltage/current detection means, the voltage detection terminal, and the temperature detection terminal; and an output control switch for conducting output control based on a signal received from the charge control means, the output control switch being provided in the charge path, wherein the charge control means conducts protection control by transmitting a signal to the output control switch for turning off an output when a rise rate of the battery pack temperature is equal to or more than a predetermined value, the battery pack comprising:

a lithium rechargeable battery to be charged including an overcharge-inhibition additive which produces a temperature rise rate increase over that without the overcharge-inhibition additive at about 120% overcharge due to gas generation or film formation on electrodes;

a positive terminal and a negative terminal for electrically connecting the lithium rechargeable battery with the battery charging apparatus for charging the lithium rechargeable battery;

a thermistor for detecting a surface temperature of the lithium rechargeable battery; and a battery-pack-side temperature detection terminal for supplying the battery charging apparatus with temperature information detected by the thermistor, wherein charging of the battery pack is controlled by the battery charging apparatus by turning off an output supplied for the battery pack when a rise rate of the battery pack temperature detected based on the information from the battery-pack-side temperature detection terminal is equal to or more than a predetermined value corresponding to the 120% overcharge and the battery pack is devoid of a controller and controller controlled charge path switch.

2. A battery pack to be charted by a battery charging apparatus including:

an AC/DC converter for converting commercial power supply to DC;

a charge output terminal for supplying the battery pack with an output from the AC/DC converter;

a GND terminal corresponding to the charge output terminal;

voltage/current detection means provided on a charge path;

over voltage protection means provided on the charge path;

a voltage detection terminal for detecting a voltage of the battery pack;

a temperature detection terminal for detecting a temperature of the battery pack;

charge control means for conducting different types of charge control based on signals received from the voltage/current detection means, the voltage detection terminal, and the temperature detection terminal; and an output control switch for conducting output control based on a signal received from the charge control means, the output control switch being provided in the charge path, wherein the charge control means conducts protection control by transmitting a signal to the output control switch for turning off an output when a rise rate of the battery pack voltage is equal to or less than a predetermined value, the battery pack comprising:

a lithium rechargeable battery to be charged including an overcharge-inhibition additive which produces a predetermined charge voltage rise rate which is greater than and then less than that without the overcharge-inhibition additive at about 120% overcharge due to gas generation or film formation on electrodes;

a positive terminal and a negative terminal for electrically connecting the lithium rechargeable battery with a battery charging apparatus for charging the lithium rechargeable battery;

battery voltage detection means for detecting a battery voltage of the lithium rechargeable battery; and a battery-pack-side voltage detection terminal for supplying the battery charging apparatus with voltage information detected by the battery voltage detection means, wherein the battery pack is controlled by the battery charging apparatus by turning off an output supplied for the battery pack when a rise rate of the battery pack voltage detected based on the information from the battery-pack-side voltage detection terminal is equal to or less than a predetermined value corresponding to the 120% overcharge and the battery pack is devoid of a controller and controller controlled charge path switch.

3. A battery charging system comprising:

a battery charging apparatus; and a battery pack, the battery charging apparatus including an AC/DC converter for converting commercial power supply to DC, a charge output terminal for supplying the battery pack with an output from the AC/DC converter, a GND terminal corresponding to the charge output terminal, voltage/current detection means provided on a charge path, over voltage protection means provided on the charge path, a voltage detection terminal for detecting a voltage of the battery pack, a temperature detection terminal for detecting a temperature of the battery pack, charge control means conducting different types of charge control based on signals received from the voltage/current detection means, the voltage detection terminal, and the temperature detection terminal, and an output control switch for conducting output control based on a signal received from the charge control means, the output control switch being provided in the charge path, the battery pack including a lithium rechargeable battery to be charged including an overcharge-inhibition additive which produces a temperature rise rate increase over that without the overcharge-inhibition additive at about 120% overcharge due to gas generation or film formation on electrodes, a positive terminal and a negative terminal for electrically connecting the lithium rechargeable battery with the battery charging apparatus for charging the lithium rechargeable battery, a thermistor for detecting a surface temperature of the lithium rechargeable battery, and a battery-pack-side temperature detection terminal for providing the battery charging apparatus with temperature information detected by the thermistor, wherein the charge control means conducts protection control for the battery pack by transmitting a signal to the output control switch for turning off an output when a rise rate of the battery pack temperature detected based on the information supplied from the battery-pack-side temperature detection terminal and the temperature detection terminal is equal to or more than a predetermined value corresponding to the 120% overcharge and the battery pack is devoid of a controller and controller controlled charge path switch.

4. A battery charging system comprising:

a battery charging apparatus; and a battery pack, the battery charging apparatus including an AC/DC converter for converting commercial power supply to DC, a charge output terminal for supplying the battery pack with an output from the AC/DC converter, a GND terminal corresponding to the charge output terminal, voltage/current detection means provided on a charge path, over voltage protection means provided on the charge path, a voltage detection terminal for detecting a voltage of the battery pack, a temperature detection terminal for detecting a temperature of the battery pack, charge control means for conducting different types of charge control based on signals received from the voltage/current detection means, the voltage detection terminal, and the temperature detection terminal, and an output control switch for conducting output control based on a signal received from the charge control means, the output control switch provided on the charge path, the battery pack including a lithium rechargeable battery to be charged including an overcharge-inhibition additive which produces a predetermined charge voltage rise rate which is greater than and then less than that without the overcharge-inhibition additive at about 120% overcharge due to gas generation or film formation on electrodes, a positive terminal and a negative terminal for electrically connecting the lithium rechargeable battery with the battery charging apparatus for charging the lithium rechargeable battery, battery voltage detection means for detecting a battery voltage of the lithium rechargeable battery, and a battery-pack-side voltage detection terminal for providing the battery charging apparatus with voltage information detected by the battery voltage detection means, wherein the charge control means conducts protection control for the battery pack by transmitting a signal to the output control switch for turning off an output when a rise rate of the battery pack voltage detected based on the information supplied from the battery-pack-side voltage detection terminal and the voltage detection terminal is equal to or less than a predetermined value corresponding to the 120% overcharge and the battery pack is devoid of a controller and controller controlled charge path switch.

5. The battery pack of claim 1 wherein the overcharge-inhibition additive begins to operate at a predetermined operation voltage of about 4.2 volts.

6. The battery pack of claim 5 wherein the overcharge-inhibition additive includes benzene rings which decompose by oxidation at the predetermined operation voltage to produce hydrogen and a polymer producing the film and increasing internal battery resistance.

7. The battery pack of claim 1 wherein the overcharge-inhibition additive includes benzene rings which decompose by oxidation at the predetermined operation voltage to produce hydrogen and a polymer producing the film and increasing internal battery resistance.

8. The battery pack of claim 1 wherein the overcharge-inhibition additive includes at least one of ortho-terphenyl, biphenyl, and diphenyl ether.

9. The battery pack of claim 2 wherein the overcharge-inhibition additive begins to operate at a predetermined operation voltage of about 4.2 volts.

10. The battery pack of claim 9 wherein the overcharge-inhibition additive includes benzene rings which decompose by oxidation at the predetermined operation voltage to produce hydrogen and a polymer producing the film and increasing internal battery resistance.

11. The battery pack of claim 2 wherein the overcharge-inhibition additive includes benzene rings which decompose by oxidation at the predetermined operation voltage to produce hydrogen and a polymer producing the film and increasing internal battery resistance.

12. The battery pack of claim 2 wherein the overcharge-inhibition additive includes at least one of ortho-terphenyl, biphenyl, and diphenyl ether.

13. The battery pack of claim 2 wherein the predetermined value for the voltage rise rate is less than zero.

14. The battery pack of claim 13 wherein the overcharge-inhibition additive includes benzene rings which decompose by oxidation at the predetermined operation voltage to produce hydrogen and a polymer producing the film and increasing internal battery resistance.

15. The battery pack of claim 3 wherein the overcharge-inhibition additive begins to operate at a predetermined operation voltage of about 4.2 volts.

16. The battery pack of claim 15 wherein the overcharge-inhibition additive includes benzene rings which decompose by oxidation at the predetermined operation voltage to produce hydrogen and a polymer producing the film and increasing internal battery resistance.

17. The battery pack of claim 3 wherein the overcharge-inhibition additive includes benzene rings which decompose by oxidation at the predetermined operation voltage to produce hydrogen and a polymer producing the film and increasing internal battery resistance.

18. The battery pack of claim 3 wherein the overcharge-inhibition additive includes at least one of ortho-terphenyl, biphenyl, and diphenyl ether.

19. The battery pack of claim 4 wherein the overcharge-inhibition additive begins to operate at a predetermined operation voltage of about 4.2 volts.

20. The battery pack of claim 19 wherein the overcharge-inhibition additive includes benzene rings which decompose by oxidation at the predetermined operation voltage to produce hydrogen and a polymer producing the film and increasing internal battery resistance.

21. The battery pack of claim 4 wherein the overcharge-inhibition additive includes benzene rings which decompose by oxidation at the predetermined operation voltage to produce hydrogen and a polymer producing the film and increasing internal battery resistance.

22. The battery pack of claim 4 wherein the overcharge-inhibition additive includes at least one of ortho-terphenyl, biphenyl, and diphenyl ether.

23. The battery pack of claim 4 wherein the predetermined value for the voltage rise rate is less than zero.

24. The battery pack of claim 23 wherein the overcharge-inhibition additive includes benzene rings which decompose by oxidation at the predetermined operation voltage to produce hydrogen and a polymer producing the film and increasing internal battery resistance.

* * * * *